United States Patent [19]

Markbreiter et al.

[11] Patent Number: 4,711,093
[45] Date of Patent: Dec. 8, 1987

[54] COGENERATION OF ELECTRICITY AND REFRIGERATION BY WORK-EXPANDING PIPELINE GAS

[75] Inventors: Stephen J. Markbreiter, Edison, N.J.; Daniel J. Dessanti, Brooklyn, N.Y.

[73] Assignees: Kryos Energy Inc., New York; The Brooklyn Union Gas Company, Brooklyn, both of N.Y.

[21] Appl. No.: 19,924

[22] Filed: Feb. 27, 1987

[51] Int. Cl.$^4$ .................................................. F25B 9/00
[52] U.S. Cl. ........................................... 62/87; 55/32; 62/20; 62/38; 137/13
[58] Field of Search ............... 62/20, 38, 87; 137/13; 55/23, 32

[56] References Cited

U.S. PATENT DOCUMENTS

| | | | |
|---|---|---|---|
| 3,002,362 | 10/1961 | Morrison | 62/87 |
| 3,355,903 | 12/1967 | LaFleur | 62/402 |
| 3,360,944 | 1/1968 | Knapp et al. | 62/12 |
| 3,735,601 | 5/1973 | Stannard | 62/87 |
| 3,886,757 | 6/1975 | McClintock et al. | 62/20 |
| 4,312,851 | 1/1982 | Isalski et al. | 55/23 |
| 4,420,950 | 12/1983 | Bodas et al. | 62/402 |
| 4,522,636 | 6/1985 | Markbreiter et al. | 62/87 |

*Primary Examiner*—Ronald C. Capossela
*Attorney, Agent, or Firm*—Paul W. Garbo

[57] ABSTRACT

Cogeneration of electricity and saleable refrigeration is achieved by passing pipeline gas with added methanol through a turbo-expander coupled to an electrical generator so that moisture in the gas forms an aqueous methanol condensate separable from the cold, expanded gas. The condensate is distilled to separate discard water from recycle methanol. After recovering refrigeration therefrom, the expanded gas is warmed to a temperature above 32° F. by adding all the required heat as reboiler heat for the distillation and passing the expanded gas in heat exchange with distilled methanol vapor which is liquefied and used partly as reflux and partly as recycle methanol.

10 Claims, 1 Drawing Figure

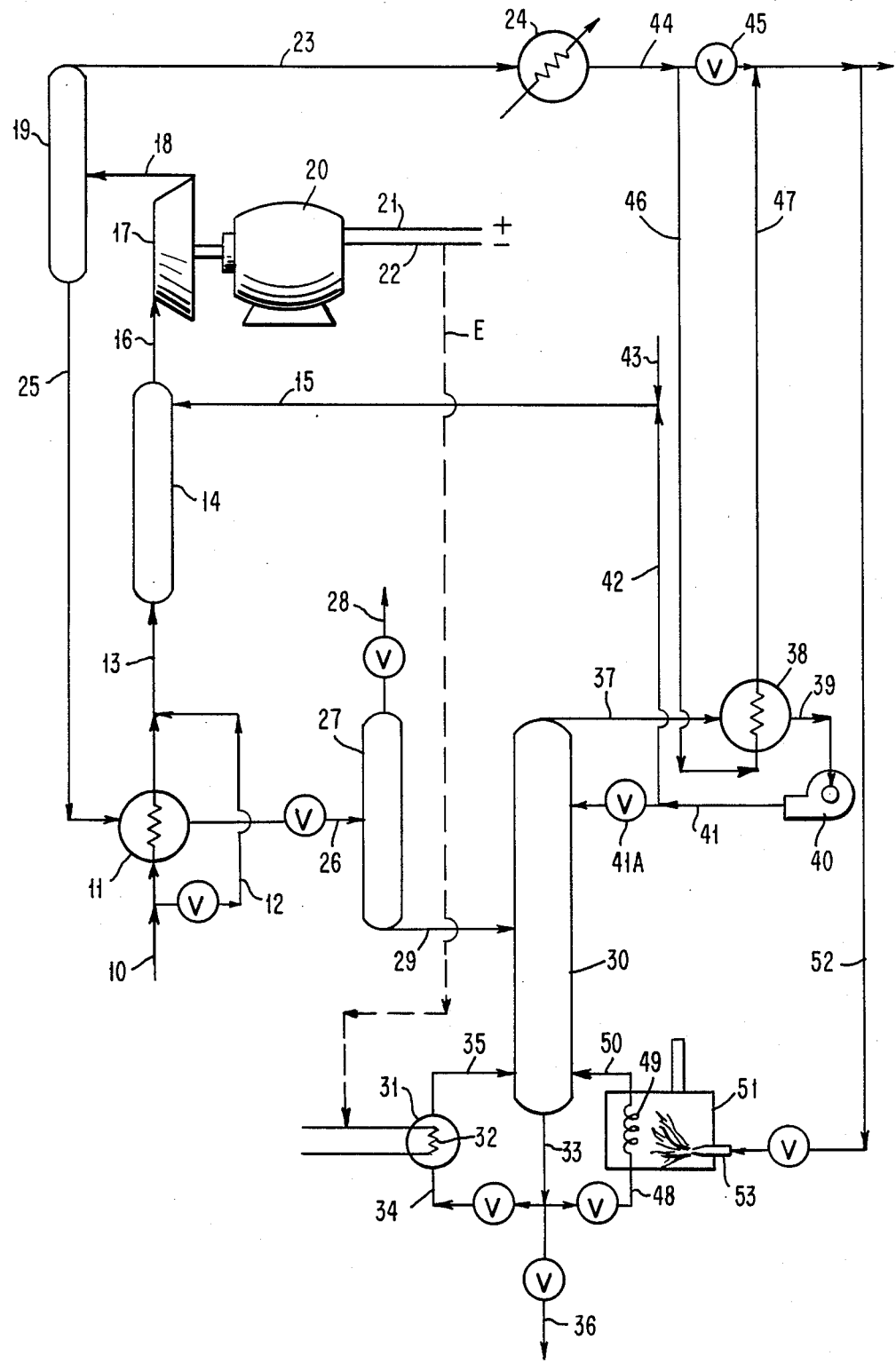

COGENERATION OF ELECTRICITY AND REFRIGERATION BY WORK-EXPANDING PIPELINE GAS

BACKGROUND OF THE INVENTION

This invention relates to the cogeneration of electricity and refrigeration during the reduction of pressure of pipeline gas. More particularly, the invention achieves such cogeneration with a simple, integrated system utilizing only a small amount of energy.

It is well known that pipeline gas usually at a pressure of at least 150 psia (pounds per square inch absolute) can be passed through an expansion engine to reduce its pressure and to convert the work abstracted from the gas into electricity with an electrical generator driven by the engine. The greater pressure reduction effected in the expander, the greater is the work performed (i.e., the greater is the generation of electricity) and also the greater is the temperature drop in the expanded gas which means the greater is the refrigeration produced. Hence, increasing the cogeneration of electricity and refrigeration depends on increasing the pressure drop of the expanded gas.

Two problems arise when designing a system to maximize the cogeneration of electricity and refrigeration by the work-expansion of pipeline gas. The first problem is that pipeline gas invariably contains moisture which must be removed before the gas is expanded to avoid icing and gas hydrates that impair the operation of the expander and possibly damage it. The other problem is that the cold, expanded gas cannot be discharged into a distribution system because temperatures of 32° F. and lower can lead to troubles such as embrittlement of the pipeline, leakage at pipe joints and freezing of ground water leading to ground heaves and stressing of the pipeline.

Elimination of both problems is simple enough. The gas must be dehydrated before it is work-expanded and the cold, expanded gas must be warmed before it is introduced into the distribution system. Both solutions require the expenditure of energy and therefore have an important impact on the financial feasibility of a cogeneration project.

Accordingly, a principal object of this invention is to cogenerate electricity and refrigeration by the work-expansion of pressurized pipeline gas while integrating the dehydration of the pipeline gas with the heating of the cold, expanded gas to curtail the expenditure of energy.

Another important object is to provide a simple, integrated cogeneration system in which the energy required to effect both gas dehydration and heating of the expanded gas is supplied solely to the dehydration operation.

These and other objects and advantages of the invention will be evident from the description which follows.

SUMMARY OF THE INVENTION

In accordance with this invention, the cogeneration of electricity and refrigeration by the expansion of high-pressure pipeline gas with the performance of work involves a unique coupling of the dehydration of the gas with the heating of the cold, expanded gas. The basic steps of the invention are: injecting a small quantity of methanol into the pipeline gas; passing the gas containing methanol through a turbo-expander coupled to an electrical generator; separating aqueous methanol condensate from the cold, expanded gas and introducing the condensate into a distillation column for separation into discard water and recycle methanol for the injection step; recovering refrigeration from the cold, expanded gas; adding heat to the reboiler of the distillation column; and passing the still cold, expanded gas after the recovery of refrigeration therefrom in heat exchange with hot methanol vapor from the top of the column to effect liquefaction of the methanol and heating of the expanded gas. Hence, the heat added to the distillation column to separate water from the aqueous methanol travels up the column in the form of hot methanol vapor and this heat in the vapor is then utilized to warm the cold, expanded gas. In short, the heat introduced into the column does double duty; it accomplishes dehydration of methanol and warming of expanded gas.

The quantity of heat supplied to the reboiler of the methanol distillation column is determined by the quantity of heat required to heat the cold, expanded gas to a temperature above freezing, say about 40° F. The quantity of heat required to warm the expanded gas is generally 2 to 4 times the quantity of heat needed to separate water and methanol in the distillation column. Substantially all of the heat entering the reboiler reaches the reflux condenser where that heat is transferred to the cold, expanded gas. Of course, a very small fraction of the heat is lost by heat leak from the column to the atmosphere and by discard of warm water from the column.

The integration of reboiler heat with heat for warming cold, expanded gas not only saves the quantity of reboiler heat that would be consumed if the two heating operations were conducted separately, but also roughly tripling the reboiler heat materially increases the flows of vapor up and condensate down the column with the result that the number of separation trays required to fractionate the water-methanol mixture is reduced. Hence, in addition to the economy of heat, the invention achieves an investment saving because of a shorter, simpler (less trays) distillation column.

The cogeneration of electricity and refrigeration pursuant to this invention can be carried on wherever pipeline gas must have its pressure reduced at least 100 psi (pounds per square inch). Most often, the need to reduce the pressure of pipeline gas arises (1) where transmission pipeline gas at a pressure generally in the range of about 400 to 1000 psia is delivered to a branch pipeline maintained generally in the range of about 150 to 450 psia and (2) where branch pipeline gas is delivered to a distribution system usually maintained at a pressure of about 30 psia.

The preferred expander is a turbo-expander which is coupled to an electrical generator. As already noted, the moisture in pipeline gas can yield icing and gas hydrates as gas is passed through the turbo-expander. Consequently, prior to expansion the gas is usually dehydrated by any of several known techniques such as liquid absorption or solid adsorption. However, for simplicity and economy, the invention is based on the use of methanol to prevent icing problems in the work-expansion of pipeline gas. By injecting methanol into the gas prior to expansion on the moisture is merely converted into an aqueous methanol condensate at the cold temperature of the expanded gas. That temperature is controlled to be not lower than −100° F. by controlling the amount of pressure reduction during the expansion of the gas with performance of work. Temperatures below −100° F. are not justified because there is no important market for refrigeration at such low temperatures. The quantity of methanol injected into the pipeline gas to prevent icing during expansion varies inversely with the initial pressure of the gas into which it is introduced. Thus, not more than 675 pounds of methanol need to be injected per million standard cubic feet of moist pipeline gas at a pressure of about 200 psia to prevent icing during work-expansion but only 225 pounds of methanol per million standard cubic feet of gas will suffice when the initial gas pressure is about 600 psia. It should be noted, however, that regardless of the rate of methanol addition to the pipeline gas, the loss of methanol is usually not more than about 1%-2% of methanol injected into the gas. In short, approximately 99% of the methanol is recovered by separating aqueous methanol condensate from the expanded gas and distilling that condensate to eliminate water and provide recycle methanol for reinjection into pipeline gas before its work-expansion.

BRIEF DESCRIPTION OF THE DRAWING

For further clarification of the invention, the ensuing description will refer to the appended drawing which is a flow diagram of a preferred embodiment of the invention.

DESCRIPTION OF PREFERRED EMBODIMENTS

The description of the flow diagram will include a specific example of branch pipeline gas at a pressure of 215 psia and temperature of 60° F. that is to be delivered to a distribution system at a pressure of 30 psia and temperature of 44° F.

About 21.5% of the gas from branch pipeline 10 passes through heat exchanger 11 wherein it is cooled about 10° F. while the bulk of the gas by-passes exchanger 11 by flowing through valved line 12. The cooled stream leaving exchanger 11 is recombined with the stream from line 12 in line 13 and at a temperature of 58° F. and pressure of 210 psia enters the bottom of column 14 wherein the gas rises through a spray of methanol supplied by line 15 at the rate of 675 pounds per million standard cubic feet of gas passing through column 14. The gas containing methanol vapor flows through line 16 into turbo-expander 17 wherein the pressure is reduced from 205 psia to 40 psia. The expanded gas leaves expander 17 through line 18 at a temperature of −80° F. and discharges into separator 19 wherein aqueous methanol condensate formed at the low temperature is removed from the expanded gas.

The work performed by expander 17 is converted into electricity by generator 20 which is driven by expander 17. Generator 20 delivers to leads 21,22, 810 kilowatt-hours of electrical energy per million standard cubic feet of expanded gas. At the same time, cold, expanded gas flows from the top of separator 19 through line 23 and refrigeration recovery exchanger 24. Antifreeze or other suitable fluid passed through exchanger 24 transfers about 147 tons of refrigeration per million standard cubic feet of gas expanded per hour to a commercial user such as a fish-freezing plant.

Aqueous methanol condensate removed from the expanded gas in separator 19 flows at a temperature of −80° F. through line 25 and heat exchanger 11, discharging at a temperature of 50° F. and pressure of 30 psia through valved line 26 into separator 27. Valved line 28 is used to vent any trace gases released from the warmed aqueous methanol which passes from separator 27 through line 29 to an intermediate level in distillation column 30.

Heat for reboiler 31 of column 30 is provided by electrical immersion heater 32 disposed within reboiler 31. Dotted line E indicates that electric power may be drawn from leads 21,22 to supply heater 32. The energy input to heater 32 from generator 20 or equivalent source is about 283 kilowatt-hours per million standard cubic feet of gas processed in accordance with this invention. This energy consumption, corresponding to about 35% of that produced by generator 20, is equivalent to 966,000 BTU per million standard cubic feet of processed gas.

Water in the bottom of column 30 flows down line 33, through valved line 34 and reboiler 31, and returns as steam to column 30 via line 35. Water at a temperature of 200° F. is discarded through valved drain line 36. Vapor rising through column 30 leaves the top through line 37 as methanol vapor at a temperature of 160° F. and passes into reflux condenser 38 from which liquid methanol at a temperature of 150° F. flows via line 39 to pump 40. Part of the pumped liquid methanol flows through line 41 and reducing valve 41A as reflux into the top portion of column 30 at a pressure of 20 psia. Line 42 serves to recycle pressurized methanol from line 41 to line 15 which supplies the methanol spray in column 14. Fresh, make-up methanol is introduced via line 43 to compensate for methanol losses which are only about 1%-2% of the methanol supplied to column 14.

The expanded gas leaves refrigeration recovery exchanger 24 at a temperature of 0° F. and a pressure of 32 psia through line 44. Valve 45 in line 44 is set to divert about 44% of the gas leaving exchanger 24 for flow through line 46 and condenser 38 wherein this gas stream is warmed to a temperature of 100° F. The warm stream returns via line 47 to line 44 for mixing with the 56% of the gas which did not flow through line 46 and condenser 38. The total gas stream at a temperature of 44° F. and pressure of 30 psia discharges from line 44 into a gas distribution system.

In summarizing the example, on an hourly basis, each million standard cubic feet of pipeline gas at a pressure of 215 psia that has its pressure reduced to 30 psia for delivery to a gas distribution system in accordance with this invention yields 527 kilowatts of saleable electricity and 147 tons of refrigeration.

In a region where saleable electricity is more valuable than fuel gas, distillation column 30 would be provided with a gas heater in lieu of electrically heated reboiler 31. As shown, valved line 48 permits water in line 33 to flow into coil 49 and steam to pass via line 50 back into column 30. Coil 49 is disposed within combustion chamber 51. Low pressure gas is drawn from line 44 through valved line 52 to burner 53 to provide a reboiler heat input of 966,000 BTU per million standard cubic feet of expanded gas. Allowing generously for radiation loss and stack loss from chamber 51, 2000 standard cubic feet of the natural gas of the example with a heating value of 1000 BTU per standard cubic foot would easily suffice to warm each million standard cubic feet of expanded gas. In short, at least 99.8% of the pipeline gas still enters the gas distribution system when gas is used for reboiler heat. Of course, the quantity of refrigeration generated remains the same whether reboiler heat is obtained by utilizing part of the cogenerated electricity or by burning a very small part of the expanded gas. By burning gas, the saleable electricity increases from 527 kilowatt-hours to 810 kilowatt-hours per million standard cubic feet of gas work-expanded pursuant to this invention.

In the foregoing example, the reboiler heat required to separate water from the aqueous methanol resulting from the injection of methanol into each million standard cubic feet of pipeline gas is only 300,000 BTU whereas the heat required to warm that quantity of gas after expansion is 966,000 BTU. By applying 966,000 BTU to the reboiler rather than 300,000 BTU, not only does the resulting more vigorous boiling permit the use of a shorter and simpler column, but also 300,000 BTU have been saved when compared with separate applications of heat to the reboiler and to the warming of expanded gas. In other words, separate applications of heat would increase the heat consumption of the example of the invention by about 31%.

As another example, natural gas with a heating value of 1000 BTU per standard cubic foot is supplied from a transmission pipeline at a pressure of 825 psia and temperature of 60° F. to a branch pipeline at a pressure of 200 psia and temperature of 40° F. after being work-expanded in accordance with this invention. By passing part of the gas through exchanger 11, the total stream enters column 14 at a temperature of about 58° F. and pressure of 820 psia. Methanol is injected into column 14 at the rate of 225 pounds per million standard cubic feet of gas to be work-expanded. The gas containing methanol vapor passes through turbo-expander 17 wherein its pressure is reduced from 815 psia to 215 psia. The cold, expanded gas at a temperature of $-70°$ F. flows through separator 19 for the removal of aqueous methanol condensate and through expander 24 where 132 tons of refrigeration are recovered for each million standard cubic feet of gas passed hourly through expander 17. At the same time, generator 20 produces 675 kilowatts of electricity. Inasmuch as in this example, the expanded gas is delivered to the branch pipeline at a temperature of 40° F. instead of 44° F. specified in the first example, the heat required to warm the expanded gas is 912,000 BTU per million standard cubic feet of gas. The smaller rate of methanol injection into column 14 reduces the heat required to separate water and methanol in distillation column 30 to 100,000 BTU per million standard cubic feet or processed gas.

By introducing all of the heat required to warm the expanded gas, i.e., 912,000 BTU, into column 30, more vigorous boiling is achieved in column 30 so that less trays are needed to separate water from methanol. Thus, a separate reboiler heat input of 100,000 BTU has been saved and the cost of column 30 has been decreased. The required heat input of 912,000 BTU can be provided by using 267 kilowatt-hours of the 675 kilowatt-hours produced by generator 20 to heat reboiler 31 or by about 2000 standard cubic feet of expanded gas in burner 53 to heat coil 49 for each million standard cubic feet of gas passed through expander 17.

The antifreeze or other refrigerant fluid passed through refrigeration recovery exchanger 24 can, in most practical operations, leave exchanger 24 at a temperature only about 5° to 10° F. warmer than the cold, expanded gas entering exchanger 24. Therefore, in the first and second examples, the refrigerant can exit exchanger 24 at a temperature as low as $-75°$ F. and $-65°$ F., respectively, and convey refrigeration to users requiring very low temperatures. For example, a producer of frozen fruit juices may use part of the refrigeration at a temperature level of $-40°$ F. and use the remaining refrigeration to maintain a cold storage room at a temperature of 20° F.

Many variations and modifications of the invention will be apparent to those skilled in the art without departing from the spirit and scope of the invention. For example, while the flow diagram shows that reboiler heat for distillation column 30 is supplied either by electrical energy from generator 20 or by burning expanded gas, obviously, any available cheaper source of energy would be utilized in lieu of the two sources shown. For instance, the use of waste heat of little value from a neighboring operation would enhance the commercial attractiveness of the invention because in such case all of the expanded gas and electricity generated would be sold. Also, as known, separate reboiler 31 may be eliminated by installing immersion electrical heater 32 in the bottom of column 30 and separate reflux condenser 38 may be eliminated by placing coils in the top of column 30 for the passage of cold, expanded gas from line 46 therethrough. While a single refrigeration recovery exchanger 24 is shown in the flow diagram, two could be used in series in line 23 to recover and convey low level refrigeration to one customer and high level refrigeration to another customer, for example, to air-condition a factory. Accordingly, only such limitations should be imposed on the invention as are set forth in the appended claims.

What is claimed is:

1. The process for the cogeneration of electricity and commercially saleable refrigeration by expanding pressurized pipeline gas with the performance of work which comprises:

injecting methanol into said pipeline gas;

passing said pipeline gas containing said methanol through a turbo-expander coupled to an electrical generator to reduce the pressure of said pipeline gas at least 100 psi but not reducing said pressure enough to drop the temperature of the resulting cold expanded gas below about $-100°$ F., said electrical generator simultaneously yielding said electricity;

separating aqueous methanol condensate from said cold expanded gas and introducing said condensate into a distillation column for separation into discard water and recycle methanol for injection into said pipeline gas;

recovering said saleable refrigeration from said cold expanded gas;

adding reboiler heat to said distillation column in an amount required to warm said expanded gas after the recovery of said saleable refrigeration therefrom to a predetermined temperature above 32° F.; and passing said expanded gas after the recovery of said saleable refrigeration therefrom in heat exchange with methanol vapor rising to the top of said distillation column to condense said methanol vapor so that liquid methanol is obtained partly for reflux in said distillation column and partly for said recycle methanol and simultaneously said expanded gas is warmed to said predetermined temperature above 32° F.

2. The process of claim 1 wherein the reboiler heat in an amount required to warm the expanded gas to a predetermined temperature is obtained by burning some of said expanded gas.

3. The process of claim 1 wherein the reboiler heat in an amount required to warm the expanded gas to a predetermined temperature is obtained with an electrical heater supplied with electricity from the electrical generator.

4. The process of claim 1 wherein the pipeline gas has a pressure in the range of about 400 to 1000 psia and when said pipeline gas is passed through the turboexpander the pressure is reduced to the range of about 150 to 450 psia.

5. The process of claim 4 wherein methanol is injected into the pipeline gas at a rate not exceeding about 225 pounds per million standard cubic feet of said pipeline gas.

6. The process of claim 1 wherein the pipeline gas has a pressure in the range of about 150 to 450 psia and when said pipeline gas is passed through the turboexpander the pressure is reduced to approximately 30 psia.

7. The process of claim 6 wherein methanol is injected into the pipeline gas at a rate not exceeding about 675 pounds per million standard cubic feet of said pipeline gas.

8. The process of claim 1 wherein methanol is injected into the pipeline gas at a rate in the range of about 225 to 675 pounds per million standard cubic feet of said pipeline gas.

9. The process of claim 1 wherein the separated aqueous methanol condensate prior to its introduction into the distillation column is warmed by heat exchange with the pipeline gas.

10. The process of claim 1 wherein the reboiler heat added to the distillation column in an amount required to warm the expanded gas to a predetermined temperature above 32° F. is at least double the reboiler heat required solely to separate the aqueous methanol condensate into discard water and recycle methanol.

* * * * *